United States Patent [19]

Christensen

[11] Patent Number: 4,757,637
[45] Date of Patent: Jul. 19, 1988

[54] FISH HOOK PROTECTION AND FLOAT DEVICE

[76] Inventor: Everett B. Christensen, 705 E. Park Ave., Staples, Minn. 56479

[21] Appl. No.: 33,249

[22] Filed: Apr. 2, 1987

[51] Int. Cl.⁴ ............................................. A01K 97/06
[52] U.S. Cl. ....................................................... 43/57.1
[58] Field of Search ................... 43/57.1, 25.2, 54.1, 43/44.87

[56] References Cited

U.S. PATENT DOCUMENTS

| | | | |
|---|---|---|---|
| 2,685,756 | 8/1954 | Mowbray | 43/54.1 |
| 2,717,470 | 9/1955 | Holdeman | 43/57.1 |
| 2,841,917 | 7/1958 | Haskell | 43/54.1 |
| 2,849,825 | 9/1958 | Reisner | 43/57.1 |
| 3,107,451 | 10/1963 | Sitzler | 43/44.87 |
| 3,141,258 | 7/1964 | Mayer | 43/57.1 |
| 3,453,770 | 7/1969 | Schultz | 43/57.1 |
| 3,512,295 | 5/1970 | La Barge | 43/57.1 |
| 3,645,419 | 2/1972 | Shorrock | 43/57.1 |
| 3,940,873 | 3/1976 | Lawless | 43/57.1 |
| 4,200,249 | 4/1980 | Synstelien | 43/57.1 |
| 4,414,771 | 11/1983 | Martin | 43/57.1 |
| 4,452,003 | 6/1984 | Deutsch et al. | |
| 4,702,035 | 10/1987 | Palm | 43/57.1 |

*Primary Examiner*—Gene P. Crosby
*Attorney, Agent, or Firm*—Palmatier & Sjoquist

[57] ABSTRACT

A hook protection and float device including a pair of cooperating enclosing halves operable to open and close with respect to each other. Flanges integral with each enclosing half are used to manipulate the halves into the open position against the biasing of a resilient band. The halves each include an exterior perimeter surface terminating in a perimeter edge. The edges provide for overlapping cooperation of the perimeter edges when the halves are closed with respect to each other. The exterior surfaces define an enclosure space for the placement therein or removal therefrom from a fish hook. The perimeter edges define a hook shank hole through which the shank portion of the hook protrudes when the hook is enclosed within the enclosure space. The present invention also includes a hook shank collar the perimeter of which is coterminous with the perimeter of the hook shank hole and extends therefrom into the enclosure space. A buoyant insert is also provided for placement in the enclosure space for providing buoyancy for the present invention when used as a float.

30 Claims, 1 Drawing Sheet

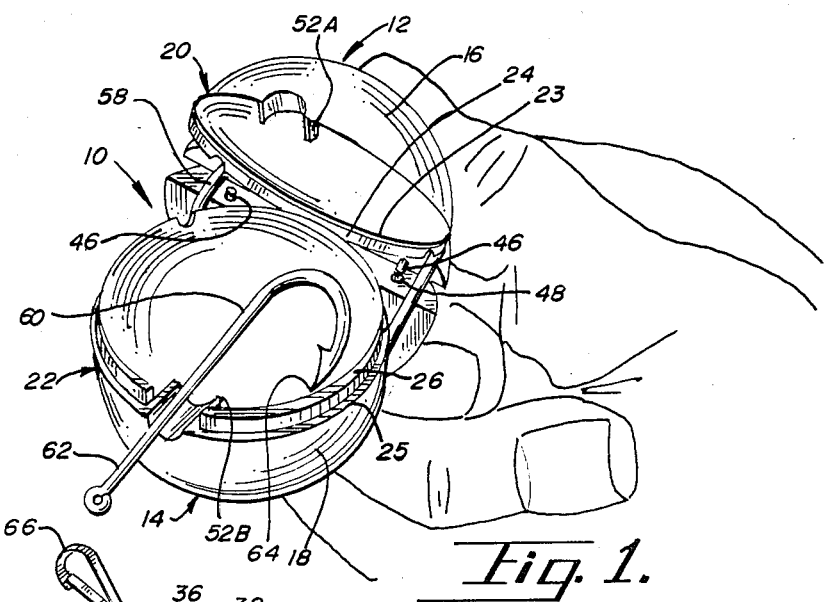
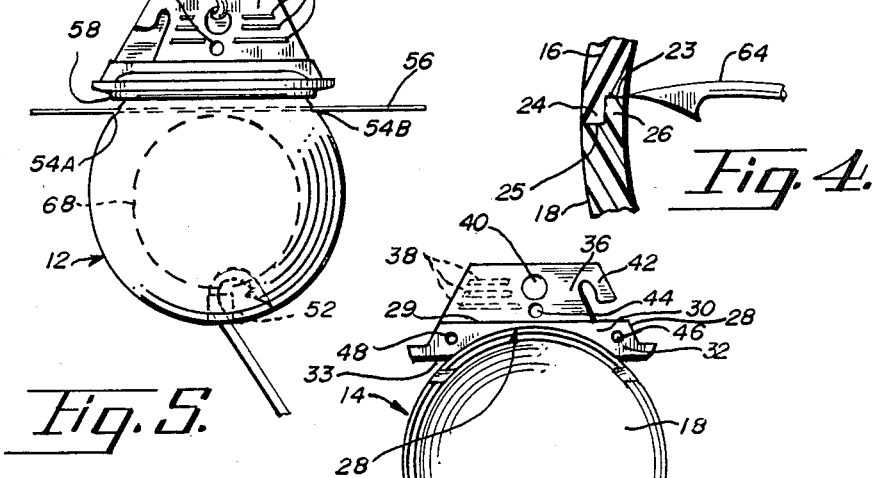
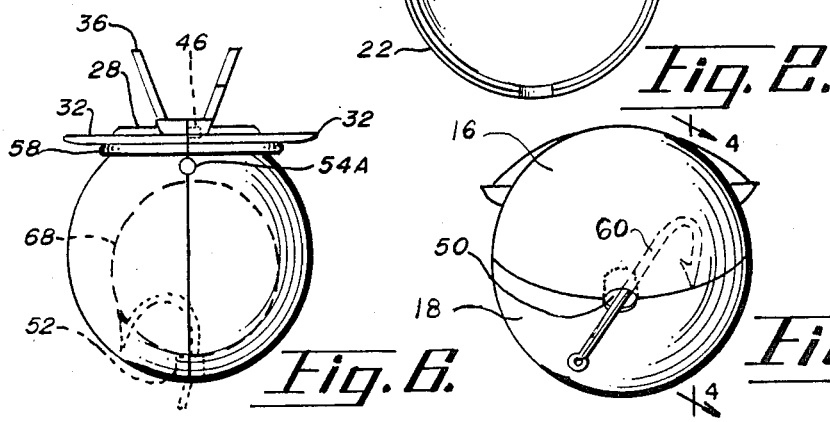

FISH HOOK PROTECTION AND FLOAT DEVICE

FIELD OF THE INVENTION

The present invention relates generally to fishing equipment, and in particular to such equipment designed to protect against injury from fish hooks, and in particular to floats or bobbers as are used to indicate a fish strike.

BACKGROUND OF THE INVENTION

Various devices are known in the prior art that are intended to protect against clothes snagging and tearing, and injury that can result from inadvertent contact with the sharp point or points of a fish hook, and to prevent against entanglement and damage of the fish hooks. U.S. Pat. Nos. 3,512,295 to LaBarge and 3,453,770 to Shultz show holders for fish hooks or lures when not attached to a fishing line. However, it is often convenient not to remove the hook or lure from the fishing line but to leave it attached thereto. Examples of devices used to cover and protect against injury from a line attached hook or lure are seen in U.S. Pat. Nos. 2,841,917 to Haskell, 3,940,873 to Lawless, 4,452,003 to Deutsch et al, 2,268,756 to Mowbray and 3,645,419 to Shorrock. However, the Haskell reference is limited primarily to use with lure attached triple hooks and the Lawless reference is limited to use with single hooks. The devices disclosed in the Deutsch et al and Mowbray references require manipulation of the hook to secure it within or onto the protection device, whereas it is desirable to minimize any such manipulation so as to reduce the chance for injury, particularly in the unsteady environment of a small fishing boat. In addition, the Mowbray device is limited to use with triple hooks and is not suited for single or double hooks.

The device disclosed in the Shorrock reference is not well suited for single or double hooks wherein the hooked portion or portions lie in essentially a single plane, as it has been observed that the pointed ends of the hooks can extend through the cooperating halves. Thus, the Shorrock device will not securely hold such hooks therein.

In addition, the Shorrock device discloses hollow sealed portions that allow it to also be used as a float. However, such sealed portions as with other floats well known in the art, depend upon the absolute integrity of the air chamber or chambers for maintaining buoyancy. Thus, if ruptured or cracked in any way, water can be allowed in resulting in a loss of buoyancy. As fishing gear can often be subject to rough handling, breakage failure of floats is a common problem.

SUMMARY OF THE INVENTION

An object of the present invention is to provide for a hook protection device for use with all manner of fish hooks whether separate, line attached or integral with a lure.

Another object of the present invention is to provide for a device that can quickly and easily enclose a hook without any need for handling thereof.

Another object of the present invention is to provide for a hook protection device that securely holds hooks and all portions thereof within the device.

It is another object of the present invention to provide for a hook protector and float wherein the buoyancy thereof is not easily compromised.

A feature of the present invention is a housing portion having an exterior perimeter surface defining a recess area. The exterior surface terminates in a perimeter edge, the perimeter edge lying in substantially a single plane. The perimeter edge cooperates with the perimeter edge of a second housing portion substantially similar in shape to the first housing portion. Each perimeter edge includes mutually cooperating recess and shoulder areas to provide for an overlapping relationship therebetween when the housing portions are closed together. When closed together the perimeter edges define a hook shank hole extending into the enclosure space defined by the exterior surfaces of the housing portions. In addition to the hook shank hole, the perimeter edges when closed define two small line holes situated across from each other on a straight line intersecting the perimeter edges at two points adjacent the fulcrum portions.

Another feature of the present invention is a hook shank collar. The collar is equal in diameter to that of the hook shank hole and one end of the collar is integral with the portions of the perimeter edges defining the shank hole and extends therefrom into the enclosure space. As one half of the perimeter of the hook shank hole is defined by each housing portion the tubular collar is divided into two halves along the plane of closure of the housing portions.

Each housing half includes a fulcrum portion integral therewith and extending therefrom adjacent the perimeter edges. Each fulcrum portion defines an annular lip extending outwardly therefrom in a plane substantially perpendicular to the plane of closure of the perimeter edges. Also, each fulcrum portion defines a fulcrum edge and includes an opening flange integral therewith and extending therefrom at an oblique angle.

A resilient band extends around both housing halves in an annular recess contained in the exterior surfaces thereof and biasing the housing halves in the closed position. The annular recess is adjacent the fulcrum portions and is defined by the annular lips thereof and the exterior surface of each housing half. The recess extends around the housing halves in a plane substantially perpendicular to that defined by the perimeter edges when in the closed position.

In operation, the housing portions are held together by the resilient band wherein the respective perimeter edges thereof abut each other in an overlapping relationship, and wherein the fulcrum portions thereof abut each other. By manipulating the flanges toward each other the housing halves pivot about each fulcrum edge thereby opening and providing access into the enclosure space. Thus, a fish hook can be placed into the enclosure space with the shank portion thereof lying along one half of the shank collar and extending through that portion of the shank hole defined by one of the housing halves. Release of the flanges causes the housing portions to close together thereby retaining the hook in the enclosure space.

It can be appreciated that the hook can remain attached to the fishing line or can be attached to a fishing lure as the shank hole provides clearance for the hook shank and/or fishing line. Furthermore, the hook itself does not need to be held or manipulated by the user as it can be suspended by the line or lure to which it is attached so that the hook protection device of the present invention can be opened to then easily enclose the hook.

It can be appreciated that the hook shank collar limits, particularly in the case of a single type hook, the range of movement thereof within the enclosure space. Such movement where there exists no hook shank collar can cause the hook to be worked through the shank hole, and thus, come out of the protection device. It can also be seen that the overlapping nature of the perimeter edges prevents the pointed end of the hook from wedging between and extending beyond the perimeter edges.

A further feature of the present invention is a buoyant insert, made preferably of styrofoam. It can be appreciated that when the invention herein is not being used to contain a hook the styrofoam insert can be placed into the enclosure cavity thus providing for a bobber or float.

The present invention, with the buoyant insert, can be used as either a slip or fixed float. To be used as a slip float the housing halves are opened and the portion of the fishing line above the hook or lure is positioned so that when the housing portions are closed the line extends directly through the small apertures adjacent the fulcrum portions. With the buoyant insert within the enclosure space and sized so as not to interfere with the fishing line passing through the small apertures, it can be appreciated that the float as described herein will allow the fishing line to pass freely therethrough until contacted by a knot or stop on the line.

To be used as a fixed float the fishing line also extends through the pair of apertures, and is then wound once or twice around one housing portion so that the line extends through the apertures two or three times and extends around the exterior perimeter surface housing half. With the housing halves closed together it can be appreciated that the float will be secured to the line.

It is an advantage of the present invention that it can be used to enclose and protect all manner of fish hooks whether single, double or triple, and whether separate, line attached or lure attached.

It is also an advantage of the present invention that the hook can be enclosed without requiring direct manipulation or handling of the hook.

It is also an advantage of the present invention that it prevents hook rotation within the enclosure space and thus, prevents the possibility of the hook working free of the enclosure.

It is also an advantage of the present invention that it incorporates overlapping edges that prevent the pointed end of the hook from extending therebetween, and thus, maintains the hook fully within the enclosure space.

It is also an advantage of the present invention that it can be used as a float in either the fixed or slip configuration.

It is also an advantage of the present invention that, when used as a float, its buoyancy is not dependant upon the absolute sealed integrity of an air chamber.

BRIEF DESCRIPTION OF THE DRAWINGS

FIG. 1 shows a perspective view of the present invention with a hook positioned therein.

FIG. 2 shows an elevational plan view of one enclosing half portion of the present invention.

FIG. 3 shows an edge plan view of the present invention.

FIG. 4 shows an enlarged detailed sectional view along lines 4—4 of FIG. 3.

FIG. 5 shows a front plan view of the present invention.

FIG. 6 shows a side plan view of the present invention.

DETAILED DESCRIPTION

The hook enclosing and float device of the present invention is seen in FIG. 1 and generally designated 10. Referring to the various figures, enclosure 10 includes two component enclosure halves 12 and 14. Each half includes a hemispherical shell portion 16 and 18, respectively, terminating in perimeter edges 20 and 22. Edge 20 includes a shoulder 23 and an annular ridge 24 for providing overlapping cooperation with correspondingly dimensioned shoulder 25 and annular ridge 26 of edge 22, when halves 12 and 14 are closed with respect to each other, as illustrated in FIG. 4. As seen in FIG. 4, ridge 24 exists on the outer periphery of shell portion 16 and shoulder 23 is located around the inner periphery thereof. Conversely, ridge 26 exists on the interior periphery of shell portion 16 and shoulder 25 is located on the exterior perimeter thereof. In this manner overlapping cooperation is provided for between halves 12 and 14 when closed with respect to each other.

As enclosure halves 12 and 14 are of essentially identical shape, structure and dimension, for simplicity of description of the present invention, only enclosure 14 will be described in detail. It being understood that the identical corresponding structures of enclosure half 12 will be numbered the same. However, when necessary to facilitate the understanding of the present invention, as for example, the description of the difference in structure between perimeter edges 20 and 22, different numerals will be used. As seen in FIG. 2, enclosure half 14 includes a fulcrum portion 28 integral with exterior shell portion 18, and including a flat surface area 30 coplanar with perimeter edge 22. Fulcrum portion 28 defines a fulcrum edge 2a and includes an annular lip 32. Annular lip 32 extends from fulcrum portion 28 in a plane substantially perpendicular to edge 22. Lip 32 together with the exterior surface portion of shell 18 adjacent lip 32 define a recess area 33 extending around shell 18 between annular lip 32 and shell 18.

An actuating flange 36 is integral with fulcrum portion 28 and extends outwardly therefrom at an oblique angle. The exterior surface of flange 36, as seen in FIG. 5, includes serrations or ridges 38 on the side thereof facing away from surface area 30, for facilitating a secure grip of flange 36. Flange 36 also includes a large eyelet hole 40 located centrally thereof, and includes an eyelet engaging hook portion 42. Flange 36 also includes a line hole 44, of smaller diameter than eyelet hole 40, and located centrally thereof below eyelet hole 40.

Fulcrum portion 28 also includes positioning means, consisting in the present case of a round peg 46 extending outwardly from surface 30 and a hole 48 extending into fulcrum 28 from surface 30. The diameter of hole 48 is slightly greater than the diameter of peg 46.

As seen in FIG. 3, the present invention includes a hook shank hole 50 extending through shell portions 16 and 18 and essentially centered at the point of junction of halves 12 and 14 at the perimeter edges 20 and 22, and located at a point thereon directly across from or equidistant from fulcrum portions 28 thereof. As seen in FIG. 1, hook shank collar portions 52A and 52B are integral with that portion of the perimeter of edges 20 and 22, respectively, that define hook shank hole 50 and extend therefrom inwardly into the enclosure space defined by exterior shells 16 and 18. As seen in FIGS. 5 and 6, when enclosure halves 12 and 14 are closed with respect to each other, hook shank collar portions combine to define an essentially round hook shank collar 52 extending into the internal space defined by shells 16 and 18.

As seen in FIGS. 5 and 6, when halves 12 and 14 are closed with respect to each other perimeter edges 20 and 22 also define two small line holes 54A and 54B. Holes 54A and 54B are positioned on perimeter edges 20 and 22 so that a fishing line 56, as seen in FIG. 5, can extend therethrough in a line substantially parallel with the plane through which annular lip 32 extends.

By referring to FIGS. 5 and 6 it can be appreciated that recess area 33 extends continuously around both enclosure halves 12 and 14. A resilient closure means 58, such as a neoprene O-ring or rubber band extends around enclosure halves 12 and 14 within recess 33, and provides for biasing halves 12 and 14 in the closed position.

The operation of the present invention can be appreciated wherein, as seen in FIG. 1, flanges 36 can be grasped and manipulated towards each other thereby separating enclosing halves 12 and 14. When in the open position, a hook 60 can be placed in the enclosure space with the shank portion 62 thereof resting upon one of the hook shank collar portions and extending through that portion of the hook shank hole defined by the enclosing half. As closure means 58 biases the halves 12 and 14 in the closed position, slow release of flanges 36 will cause halves 12 and 14 to close upon each other wherein perimeter edges 20 and 22 engage in an overlapping cooperating manner. It can be seen that halves 12 and 14 pivot about the fulcrum edges 29 of each respective fulcrum portions 28 and that the respective pegs 46 and holes 48 cooperate to keep halves 12 and 14 in the proper register or alignment. The overlapping cooperation of edges 20 and 22 also provides for mainaining the enclosing halves 12 and 14 in proper register. It is clear that the sharpened point end 64 of hook 60 need not be directly held or manipulated to be enclosed safely within the hook protecting device 10 of the present invention, it being sufficient to hold only the shank portion 62 thereof. Also, if the particular fish hook remains attached to a fishing line or lure the hook can be easily enclosed in the present invention while suspended from the fishing line or lure. Although, hook 60 as indicated in FIG. 1, is a single hook, it can be appreciated that the present invention is also completely suitable for enclosing double or triple hooks whether line attached or secured to a fishing lure. It can also be understood that hook shank hole 50 can be sized to accommodate virtually any size fishing line or hook shank thereby ensuring tight closure of the enclosing halves 12 and 14. Enclosing halves 12 and 14 can themselves be proportioned so as to efficiently accommodate the particular size hook being enclosed. It is contemplated in the case of a fishing lure having two or three hooks suspended therefrom that the hook protecting device as disclosed herein can be used to surround each of the hooks thereof thereby rendering the particular lure safe to handle, and preventing its entanglement with other hooks or lures in a tackle box. As seen in FIG. 4, the overlapping cooperation of ridges 24 and 26 and shoulders 23 and 25 prevents the barbed or point end 64 of the hook from wedging or extending there through, thereby maintaining the point 64 of the hook safely within the enclosure space.

A particular problem exists with single hooks, wherein random movement thereof can cause the hook to be worked out of the enclosure area through the hook shank hole. As seen in FIG. 5, it can be appreciated that the extension of the hook shank collar 52 into the enclosure space reduces the range of movement of hook 60 while in the enclosure space thereby reducing the chance of such a single type hook accidentally working out of the enclosure space.

As seen in FIG. 5 when enclosure halves 12 and 14 are in the closed position with respect to each other, the eyelet hook portions 42 of each respective flange 36 are oriented opposite directions from each other. Eyelet hooks 42 provide a convenient means of hooking the protecting device of the present invention to the eyelet of the fishing rod when the hook enclosed therein remains attached to a fishing line. Thus, extension of either of eyelet hooks 42 into the eyelet of a fishing rod followed by a subsequent tightening of the fishing line will allow the protecting device 10 and the hook therein to be held securely to the fishing rod and not swing freely therefrom. As an alternative thereto, eyelet holes 40 have been provided through which a spring clip means 66 can extend and be used to secure to the eyelet or other suitable portion of the fishing rod.

The present invention can also be used as a float or bobber. After opening halves 12 and 14 as above described a buoyant insert 68 can be placed therein to provide buoyancy therefor. Buoyant insert 68 is preferably a spherical piece of styrofoam. In general, bobbers are used to indicate a fish strike and are secured to the fishing line in either a fixed or sliding manner. A fixed bobber is secured to the fishing line such that any movement of the line causes immediate movement of the bobber. In a slip arrangement, the bobber is allowed to slide freely along the line for a certain distance allowing the fish to take the hook and move with it a certain distance before the bobber indicates a strike.

In the fixed position the protecting device and float of the present invention is first opened, and a portion of the fishing line above the lure or hook is laid therein so that the line will extend through perimeter edge holes 54A and 54B. The line is then wound once or twice around the exterior of one of the enclosing half portions, after which the halves are closed together so that the fishing line and the portions thereof wound around the enclosing half extend through perimeter line holes 54A and 54B. Thus, with insert 68 located in the enclosure space and the enclosing halves 12 and 14 closed with respect to each other the present invention will be firmly secured to the fishing line and function as a fixed float. Furthermore, as holes 54A and 54B are sized to be slightly larger than the diameter of line 56 and as line 56 is not bent sharply at any point when wound around the enclosing half, kinks are prevented from forming in line 56 even through the enclosing half is securely attached hereto.

In the slip bobber configuration the fishing line will extend through perimeter edges holes 54A and 54B as described above; however, the fishing line will not be wrapped once or twice around one of the enclosing halves but will extend directly through holes 54A and 54B. In this manner the hook protecting device and bobber of the present invention is free to move along the fishing line. As seen in FIG. 5, insert 68 is sized so as to allow clearance between it and the fishing line and hook shank collar 52. Also, as holes 54A and 54B need only be of a diameter sufficient to allow free movement of the fishing line, a knot, or its equivalent, of suitable size along the fishing line can stop the free movement of the line therethrough.

A fixed or slip bobber arrangement can also be provided for by extending the fishing line through eyelet holes 40 or line flange holes 44 and 45, wherein, in the slip arrangement, the line can extend directly through the respective pairs of holes or in the fixed arrangement the fishing line can simply be tied to one or both of the flanges using either of the eyelet holes 40 or the line flange holes 44.

It can be appreciated by those skilled in the art that shell portions 16 and 18 can be of any regular or irregular shapes other than hemispherical. Also, the present invention is preferably made of a resiliant plastic material such as polypropylene.

What is claimed is:

1. A hook protecting device, comprising
   a first enclosing half and a second enclosing half, each enclosing half having an exterior surface and each exterior surface terminating in a perimeter edge, the perimeter edges including means for providing overlapping cooperation between the perimeter edges when in a closed position relative to each other, and when in the closed position the exterior surfaces of the enclosing halves defining a hook enclosure space,
   a fulcrum portion integral with each enclosing half and adjacent each perimeter edge,
   an opening flange, integral with each fulcrum portion and extending therefrom at an oblique angle, the flanges for opening the enclosing halves relative to each other about the fulcrum portions thereof,
   an annular recess extending around and defined by the exterior surface of the first and second enclosing halves,
   resilient closure means extending around the first and second enclosing halves in the annular recess for biasing the enclosing halves in the closed position, and
   the perimeter edges defining a hook shank hole extending through the exterior surface of the enclosing halves into the enclosure space defined by the enclosing halves when in the closed position.

2. The hook protecting device as defined in claim 1 and further comprising, a hook shank collar having a first portion one end thereof integral with that portion of the perimeter of the hook shank hole defined by the perimeter edge of the first enclosing half and extending therefrom into the enclosure space, and having a second portion one end thereof integral with that portion of the perimeter of the hook shank hole defined by the perimeter edge of the second enclosing half and extending therefrom into the enclosure space.

3. The hook protecting device as defined in claim 1 wherein at least one opening flange includes an eyelet hook portion.

4. The hook protecting device as defined in claim 1 wherein, each fulcrum portion includes mutually cooperating positioning means.

5. The hook protecting device as defined in claim 1 wherein, at least one opening flange includes an eyelet hole.

6. The hook protecting device as defined in claim 1 wherein, each opening flange includes gripping serrations.

7. The hook protecting device as defined in claim 1 wherein, the recess extends around the exterior surface of each of the enclosing halves adjacent the fulcrum portions.

8. The hook protecting device as defined in claim 1 wherein, the hook shank hole is located at a position on the perimeter edges of the first and second enclosing halves opposite from the fulcrum portions.

9. The hook protecting device as defined in claim 1, and further comprising, a buoyant insert located within the enclosure space.

10. The hook protecting device as defined in claim 9 and the perimeter edges defining a pair of perimeter line holes.

11. The hook protecting device as defined in claim 10, and the perimeter line holes being located adjacent the fulcrum portions of the enclosing halves.

12. The hook protecting device as defined in claim 11 and each opening flange including a line flange hole.

13. A hook protector and a float device, comprising:
    a first enclosing half and a second enclosing half, each enclosing half having an exterior surface and each exterior surface terminating in a perimeter edge, the perimeter edges including means for providing overlapping cooperation between the perimeter edges when in a closed position relative to each other, and when in the closed position the exterior surfaces of the enclosing halves defining a hook enclosure space,
    a fulcrum portion integral with each enclosing half and adjacent each perimeter edge,
    an opening flange, integral with each fulcrum portion and extending therefrom at an oblique angle, the flanges for opening the enclosing halves relative to each other about the fulcrum portions thereof,
    an annular recess extending around and defined by the exterior surface of the first and second enclosing halves,
    resilient closure means extending around the first and second enclosing halves in the annular recess for biasing the enclosing halves in the closed position,
    a pair of perimeter edge line holes, each perimeter edge line hole defined by the perimeter edges of the first and second housing portions, and
    a buoyant insert located within the enclosure space.

14. The hook protecting and float device as defined in claim 13, and the perimeter edge holes being located adjacent the fulcrum portions of the enclosing halves.

15. The hook protecting and float device as defined in claim 13 and having a line flange hole located in each opening flange.

16. The hook protecting and float device as defined in claim 13, and further including a hook shank hole extending through the exterior surfaces of the enclosing halves into the enclosure space defined by the enclosing halves when in the closed position.

17. The hook protecting and float device as defined in claim 16 wherein, the hook shank hole is located at a position on the perimeter edges of the first and second enclosing halves opposite from the fulcrum portions.

18. The hook protecting and float device as defined in claim 13, and further comprising, a hook shank collar having a first portion one end thereof integral with that portion of the perimeter of the hook shank hole defined by the perimeter edge of the first enclosing half portion and extending therefrom into the enclosure space, and having a second portion one end thereof integral with that portion of the perimeter of the hook shank enclosing hole defined by the perimeter of the second enclosing half and extending therefrom into the enclosure space.

19. The hook protecting and float device as defined in claim 13 wherein, at least one opening flange includes an eyelet hook portion.

20. The hook protecting and float device as defined in claim 13 wherein, each fulcrum portion includes mutually cooperating positioning means.

21. The hook protecting and float device as defined in claim 13 wherein, at least one opening flange includes an eyelet hole.

22. The hook protecting and float device as defined in claim 13 wherein, each opening flange includes gripping serrations.

23. The hook protecting and float device as defined in claim 13 wherein the recess extends around the exterior surface of each of the enclosing halves adjacent the fulcrum portions.

24. A hook protecting and float device, comprising
a first enclosing half and a second enclosing half, each enclosing half having an exterior surface and each exterior surface terminating in a perimeter edge, the perimeter edges including means for providing overlapping cooperation between the perimeter edges when in a closed relation to each other, and when in the closed position the exterior surfaces of the enclosing halves defining a hook enclosure space,
a fulcrum portion integral with each enclosing half and adjacent each perimeter edge,
an opening flange, integral with each fulcrum portion and extending therefrom at an oblique angle, the flanges for opening the enclosing halves relative to each other about the fulcrum portions thereof,
an annular recess extending around and defined by the exterior surface of the first and second enclosing halves,
resilient closure means extending around the first and second enclosing halves in the annular recess for biasing the enclosing halves in the closed position,
the perimeter edges defining a hook shank hole extending through the exterior surface of the enclosing halves into the enclosure space defined by the enclosure halves when in the closed position, and the perimeter edges also defining a pair of perimeter edge line holes,
a buoyant insert located within the enclosure space, and
a hook shank collar having a first portion one end thereof integral with that portion of the perimeter of the hook shank hole defined by the perimeter edge of the first enclosing half and extending therefrom into the enclosure space, and having a second portion one end thereof integral with that portion of the perimeter of the hook shank hole defined by the perimeter edge of the second enclosing half and extending therefrom into the enclosure space.

25. The hook protecting and float device as defined in claim 24 wherein, the recess extends around the exterior surface of each of the enclosing halves adjacent the fulcrum portions.

26. The hook protecting and float device as defined in claim 24 wherein, the hook shank hole is located at a position on the perimeter edges of the first and second enclosing halves opposite from the fulcrum portions.

27. The hook protecting and float device as defined in claim 24 wherein, at least one opening flange includes an eyelet hook portion.

28. The hook protecting and float device as defined in claim 24 wherein, each fulcrum includes mutually cooperating positioning means.

29. The hook protecting and float device as defined in the claim 24 wherein, at least one opening flange includes an eyelet hole.

30. The hook protecting and float device as defined in claim 24 wherein, each opening flange includes gripping serrations.

* * * * *